UNITED STATES PATENT OFFICE.

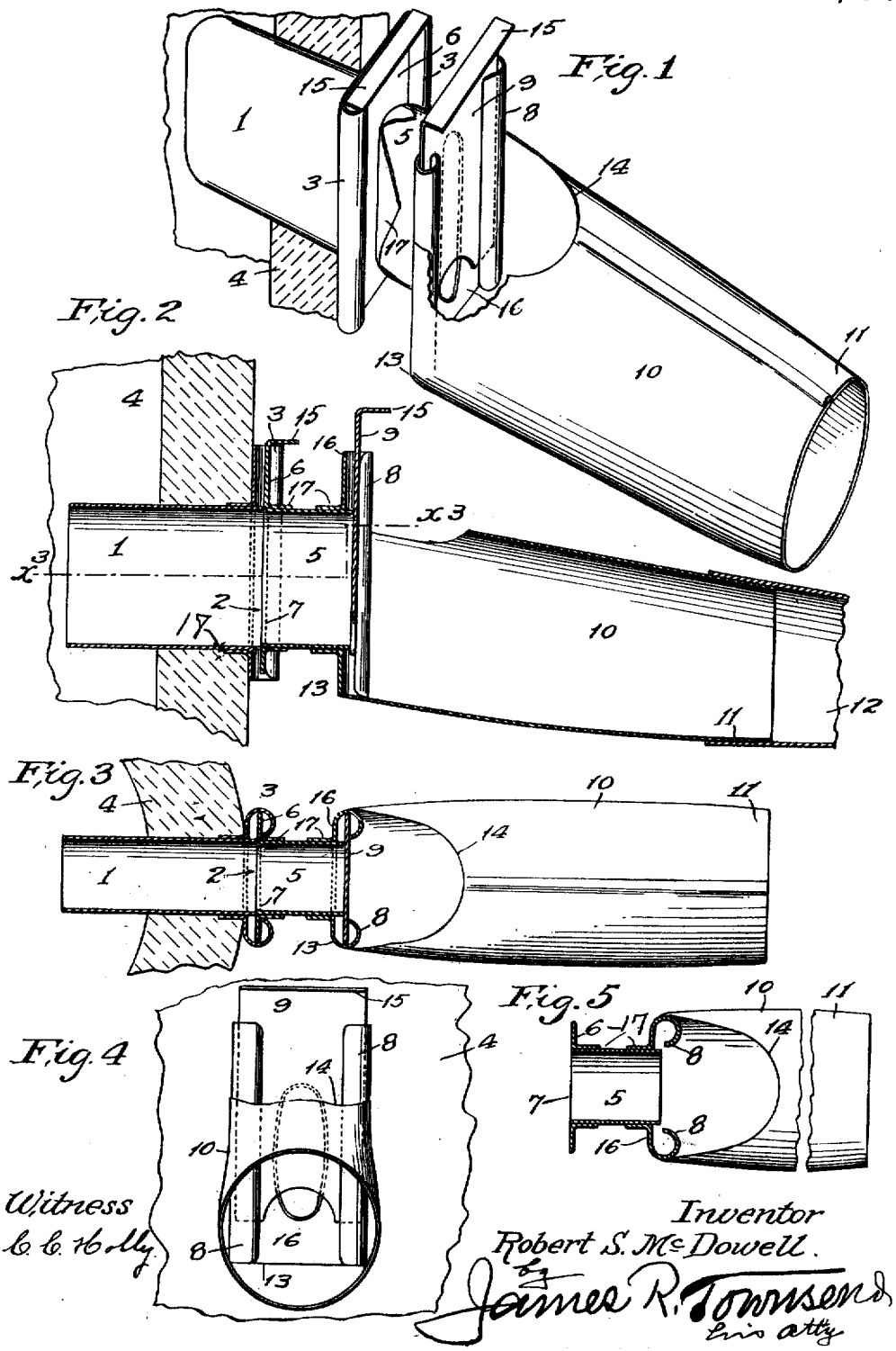

ROBERT S. McDOWELL, OF PASADENA, CALIFORNIA, ASSIGNOR OF ONE-HALF TO JOSEPH BREYER, OF REDLANDS, CALIFORNIA.

IRRIGATING-GATE ATTACHMENT.

1,325,496.  Specification of Letters Patent.  Patented Dec. 16, 1919.

Application filed July 11, 1918. Serial No. 244,499.

*To all whom it may concern:*

Be it known that I, ROBERT S. MCDOWELL, a citizen of the United States, residing at 581 North El Molino avenue, in the city of Pasadena, in the county of Los Angeles and State of California, have invented a new and useful Irrigating-Gate Attachment, of which the following is a specification.

An object of this invention is to provide means whereby irrigating gates of a common and well known construction can be connected with the stand pipes of irrigating pipe lines for conducting the water from the irrigating stand pipe to the irrigating ditch or other place or places to which it is desired to conduct the irrigation water.

This invention relates more particularly to irrigating gates arranged in stand pipes to deliver water under pressure therefrom but it is applicable to pipe lines or flumes on irrigating hydrants where the orifice through which the water is delivered is controlled by a slide adjustable relative to the orifice to close it to a greater or less extent.

In previous devices of this class the water falls to the ground and cuts away the earth, thus forming deep basins and saturating the ground about the stand pipe.

This invention is primary, broadly new and pioneer in that I have provided a slide to fit in the guideway of the slide that is common to such gates, and said new slide is provided with an orifice also with a conduit having an orifice controlled by a gate and opening into an extension adapted to deliver the water for irrigation or other purposes allowing the water to fall to the ground as previously.

The invention includes a conduit provided with a spout and having an orifice discharging into said spout and provided with a gate between the conduit and the spout whereby the flow from the conduit to the spout may be controlled or completely cut off.

Objects of the invention are cheapness and convenience and the avoidance of cutting hollows or basins in the earth at the side of the irrigating flume or pipe from which the irrigating water is discharged.

Other objects, advantages and features of novelty may appear from the accompanying drawing, the subjoined detail description and the appended claims.

The accompanying drawings illustrate the invention in the form that I at present deem most advisable.

Figure 1 is a perspective view of the invention applied to an irrigating stand pipe, a fragment of which is shown in section. Parts are broken for clearness of illustration.

Fig. 2 is an axial section of the device shown in Fig. 1.

Fig. 3 is a plan partly in section on line $x^3$—$x^3$ Fig. 2.

Fig 4 is an elevation at the outlet end.

Fig. 5 is a fragmental plan of the attachment partly in section.

The gate-head comprising a tubular body 1 having its outlet 2 projecting between the guides 3 is of common construction and is adapted to be mounted in a stand pipe 4. The conduit 5 is connected to the supporting slide 6, that is adapted to the guideways 3 and to the outlet 2 of the gate head so that when the slide is shoved home it closes the outlet against lateral escape of water and supports the conduit 5, but leaves the outlet open for onflow of water from the gate head. Said slide 6 is provided with an orifice 7 communicating with the conduit, so that when the slide is in place, liquid may flow through the slide, from the body 1 into the conduit. The outlet end of said conduit is provided with guides 8 and a slide 9 is mounted in said guide to adjustably close the outlet from the conduit. An extension 10 is connected to the guides 8 and to the conduit 5 to receive water from the conduit and to conduct it from the outlet 7, so that water flowing through the outlet 7 will not fall to the ground and cut out a hollow or basin.

The extension 10 is in the form of a spout and the front end of the spout is tapered as at 11, so that it can be inserted into a pipe section 12 by which the water may be carried to the place required. The receiving end of the spout or conduit extension is shown rectangular at the lower part and fits the guide which is angular to correspond therewith as at 13.

An opening 14 may be cut into the top of the spout at the guides 8 to allow inspection of the stream at the orifice through which the irrigating water flows from the stand pipe.

The slides are provided at the upper end with the usual finger pieces 15 by which they may be pulled upward.

The slide 6 and the guide plates 16 are preferably stampings. The burs 17 of the stampings at the orifices 7 are not cut off from the guide plate or slide plate but form tangs that fit upon the sides of the body 1 or the conduit 5 and are soldered thereto to insure against breaking or wrenching loose under the weight of the pipe connected to the extension, or of the water flowing therethrough. The guides 8 serve the double purpose of supporting the extension and guiding the slide; thus simplifying the work of assembling the parts and completing the gate.

In practice the gate will be installed in the usual way with its body 1 seated in the stand pipe 4; the usual slide 9 is withdrawn and is inserted into the guide-way 8 and the slide 6 is slid down into place so that conduit 5 constitutes a continuation of body 1. Then pipe 12 may be attached to the spout at 11, the slide 9 drawn up into irrigating position indicated in Figs. 1, 2 and 4, and the work of irrigating is performed in the usual way; the gate or slide 9 may be opened and closed in the usual way and by reason of the tangs 17 the pressure upon gate 9 is borne by the attachment without breaking the connection between the conduit and either of the guideways and without disrupting or disarranging any of the parts; and the spout and the conduits and the other parts will hold up under the weight imposed upon the spout 10 by weight of pipe 12 and the water flowing therethrough.

I claim,

1. The combination with a water gate head outlet and guides, of a slide adapted to said guides and outlet and provided with an orifice to communicate with said outlet; a conduit fastened to the slide around said orifice and provided with a guideway; a supplemental slide adapted to said guideway and to adjustably close the outlet from said conduit and an extension connected to said guideway to receive the flow from said outlet.

2. The combination with a main conduit, of a detachable extension adapted to receive the flow from the main conduit, a slide to control the flow from the conduit to the extension; and means connecting the conduit and extension and also forming a guide for the slide.

3. An attachment for an irrigating gate head, comprising a main conduit; an outlet to the gate head; means for connecting the main conduit to said outlet of the irrigating gate head; a guide fixed to the conduit; a spout projecting from said guide to receive the flow from the conduit; and a slide working in said guide to close the spout from the conduit.

4. An attachment for an irrigating gate head comprising a conduit; means for connecting the conduit and outlet to the gate head, outlet of the irrigating gate head; a guide fixed to the conduit; a spout projecting from said guide to receive the flow from the conduit, and a slide working in said guide to close the outlet from the conduit; said spout being provided at the top with an orifice opening to the outlet and slide; the end of the spout being adapted for detachable connection to a pipe.

5. In an attachment adapted to be connected by means of a transverse slide to an irrigating gate head having a guide-way; the transverse slides set forth adapted to slide in the guide-way of the gate head, and being provided with an orifice and with tangs stamped from the slide to form in the slide an orifice through which water may flow; and a conduit fixed to said tangs and adapted to the orifice to conduct water therefrom.

6. In an attachment adapted to be connected to an irrigating gate head, having a guide-way; a slide adapted to slide in the guide-way of the gate head; said slide being provided with an orifice and with tangs stamped from the slide to form in the slide an orifice through which water may flow; a conduit fixed to said tangs and adapted to the orifice to conduct water therefrom; a guide plate having guides and provided between the guides with an orifice and with tangs adapted to said conduit and fastened thereto; a slide in the guides of said guide plate; and a spout fixed to the guide plate and adapted for connection with a pipe by which the water may be conducted to the ground.

7. An attachment for an irrigating gate head comprising a conduit; a guide-way fixed thereto; a slide in the guide-way to close the conduit; and a spout connected to and supported by the guide-way to conduct water from the conduit and adapted for telescopic connection to a pipe.

In testimony whereof, I have hereunto set my hand at Los Angeles, California, this 1st day of July 1918.

ROBERT S. McDOWELL.

Witness:
    JAMES R. TOWNSEND.

It is hereby certified that in Letters Patent No. 1,325,496, granted December 16, 1919, upon the application of Robert S. McDowell, of Pasadena, California, for an improvement in "Irrigating-Gate Attachments," errors appear in the printed specification requiring correction as follows: Page 1, line 36, after the word "purposes" insert the word *without;* page 2, line 67, claim 4, after the word "conduit" insert the words *and outlet;* same page and claim, line 68, strike out the words "and outlet"; and that the said Letters Patent should be read with these corrections therein that the same may conform to the record of the case in the Patent Office.

Signed and sealed this 20th day of January, A. D., 1920.

[SEAL.] M. H. COULSTON,

*Acting Commissioner of Patents.*

Cl. 251—56.